(12) United States Patent
Ferris et al.

(10) Patent No.: US 11,177,764 B2
(45) Date of Patent: Nov. 16, 2021

(54) SOLAR ROOF STRUCTURE

(71) Applicant: Shadepower Group Pty Ltd, Lonsdale (AU)

(72) Inventors: Andrew Ferris, Lonsdale (AU); Howard Kohler, Lonsdale (AU); Myles Kohler, Lonsdale (AU)

(73) Assignee: Shadepower Group Pty Ltd

( * ) Notice: Subject to any disclaimer, the term of this patent is extended or adjusted under 35 U.S.C. 154(b) by 0 days.

(21) Appl. No.: 16/643,229

(22) PCT Filed: Aug. 29, 2018

(86) PCT No.: PCT/AU2018/050926
§ 371 (c)(1),
(2) Date: Feb. 28, 2020

(87) PCT Pub. No.: WO2019/040986
PCT Pub. Date: Mar. 7, 2019

(65) Prior Publication Data
US 2020/0266754 A1    Aug. 20, 2020

(30) Foreign Application Priority Data

Aug. 31, 2017  (AU) ................................ 2017903516

(51) Int. Cl.
*H02S 20/23* (2014.01)
*H02S 30/10* (2014.01)
(Continued)

(52) U.S. Cl.
CPC .............. *H02S 20/23* (2014.12); *F24S 20/67* (2018.05); *F24S 25/12* (2018.05); *F24S 25/61* (2018.05);
(Continued)

(58) Field of Classification Search
CPC ....... H02S 30/10; F24S 25/634; F24S 25/636; F24S 25/65; F24S 25/70; F24S 25/632;
(Continued)

(56) References Cited

U.S. PATENT DOCUMENTS

| 4,123,883 A * | 11/1978 | Barber, Jr. | ............... F24S 25/61 |
| | | | 52/200 |
| 6,105,317 A * | 8/2000 | Tomiuchi | ................ F24S 25/37 |
| | | | 52/173.3 |

(Continued)

FOREIGN PATENT DOCUMENTS

| DE | 20200515455 | 3/2007 |
| JP | 1150621 | 2/1999 |
| WO | 2017/023752 | 2/2017 |

*Primary Examiner* — Kyle J. Walraed-Sullivan
(74) *Attorney, Agent, or Firm* — Sand, Sebolt & Wernow Co., LPA

(57) ABSTRACT

There is proposed an apparatus used for holding solar panels and a roof structure, including an elongate rail member, an elongate capping member movably connected to the elongate rail member, a plurality of interconnected adjustment devices, and a drive mechanism. The adjustment devices are spaced apart along a length of the elongate rail member and are configured to move the elongate capping member relative to the elongate rail member. The drive mechanism is configured to control the movement of the adjustment devices to affect the clamping of the solar array panels between the elongate capping member and the elongate rail member. The drive mechanism is adjustable from a single location along the elongate rail member, such as from an end.

14 Claims, 16 Drawing Sheets

(51) Int. Cl.
*F24S 25/636* (2018.01)
*H02S 20/10* (2014.01)
*F24S 20/67* (2018.01)
*F24S 25/634* (2018.01)
*F24S 25/61* (2018.01)
*F24S 25/12* (2018.01)
*F24S 25/00* (2018.01)
*F24S 25/60* (2018.01)

(52) U.S. Cl.
CPC ............ *F24S 25/634* (2018.05); *H02S 20/10* (2014.12); *H02S 30/10* (2014.12); *F24S 2025/022* (2018.05); *F24S 2025/6003* (2018.05)

(58) Field of Classification Search
CPC ......... F24S 2025/022; F24S 2025/6003; F24S 2025/6006; F24S 40/44
USPC ...................................................... 52/173.3
See application file for complete search history.

(56) References Cited

U.S. PATENT DOCUMENTS

| | | | |
|---|---|---|---|
| 6,414,237 B1* | 7/2002 | Boer | F24S 25/632 136/251 |
| 10,622,935 B1* | 4/2020 | Liu | H02S 30/00 |
| 2005/0115176 A1* | 6/2005 | Russell | E04D 3/3608 52/220.1 |
| 2009/0282755 A1 | 11/2009 | Abbott et al. | |
| 2011/0138585 A1* | 6/2011 | Kmita | F24S 25/636 24/522 |
| 2011/0214365 A1* | 9/2011 | Aftanas | F24S 25/636 52/173.3 |
| 2013/0340358 A1* | 12/2013 | Danning | H02S 20/23 52/126.7 |
| 2015/0107168 A1* | 4/2015 | Kobayashi | F24S 25/70 52/173.3 |
| 2015/0184896 A1 | 7/2015 | Lippert et al. | |
| 2016/0043686 A1 | 2/2016 | Hsueh | |
| 2016/0134229 A1 | 5/2016 | Hsueh | |
| 2016/0305459 A1* | 10/2016 | Park | F24S 25/61 |
| 2017/0005215 A1* | 1/2017 | Wang | B32B 17/1055 |
| 2017/0063007 A1* | 3/2017 | Hudson | H01R 25/142 |

* cited by examiner

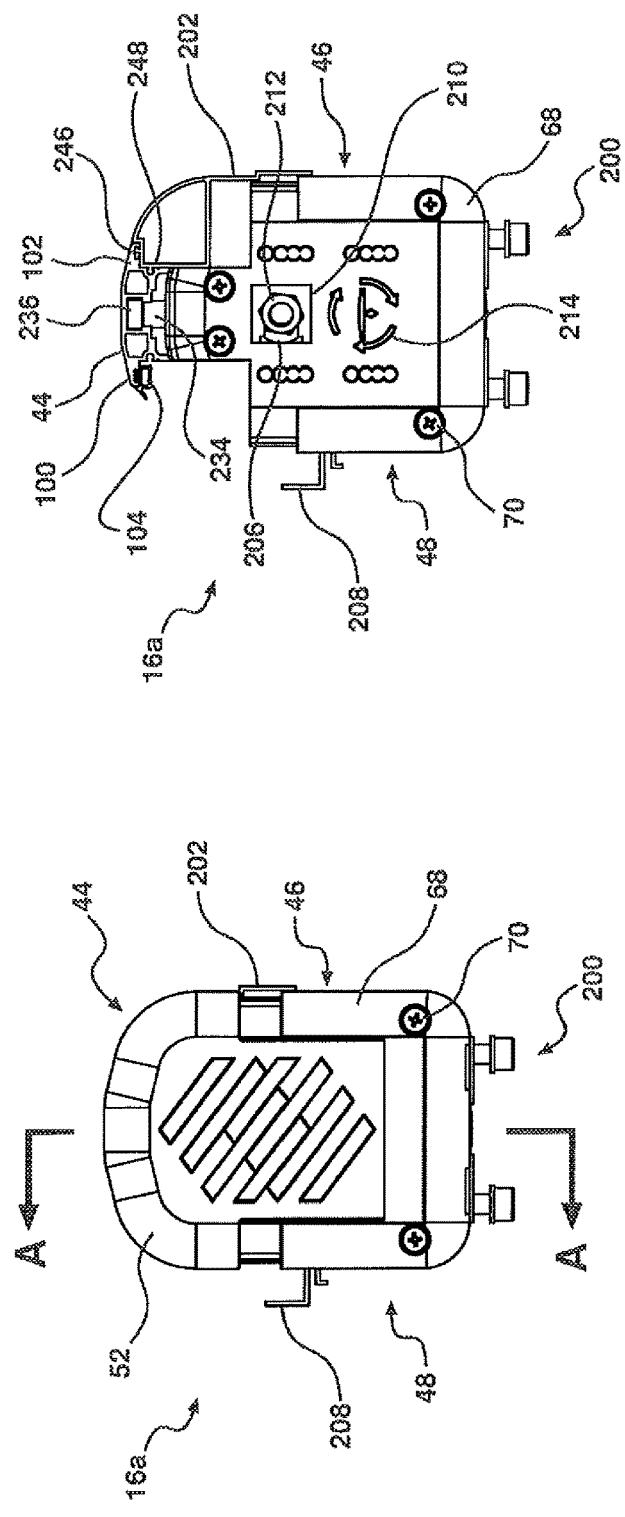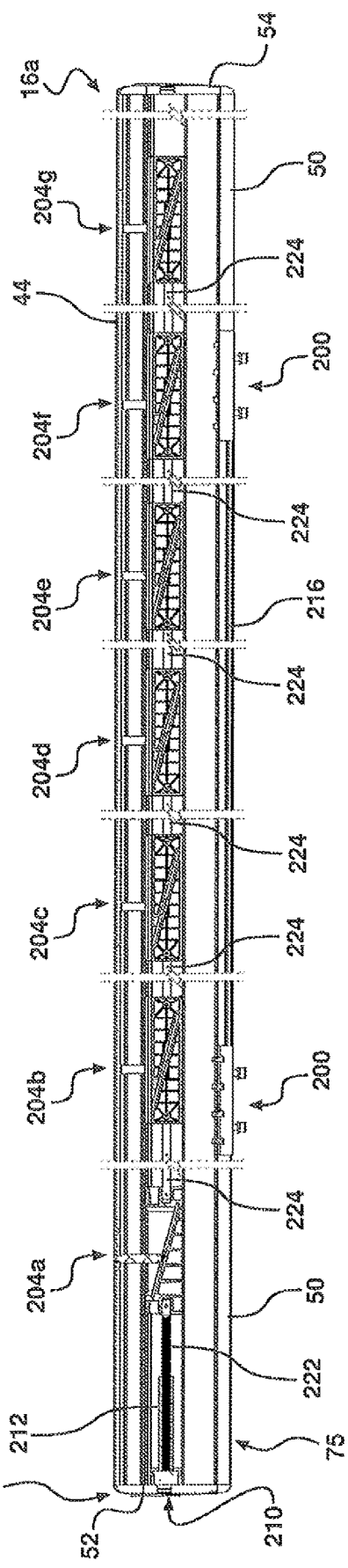
Figure 21a
Figure 21b
Figure 22

SOLAR ROOF STRUCTURE

FIELD OF THE INVENTION

The present disclosure relates to a roof structure incorporating a plurality of solar array modules.

BACKGROUND OF THE INVENTION

There are various forms of building-integrated photovoltaics (BIPV) currently available in the market or suggested in the prior art that comprise interconnected solar power generation modules in place of an ordinary roof structure or part thereof.

Some apparatuses, including that disclosed in U.S. Pat. No. 8,196,360, comprise overlapping solar modules that replace shingles or roof tiles.

Another mounting system for an array of solar modules is disclosed in U.S. Pat. No. 6,105,317 (TOMIUCHI et al.). The mounting system of Tomiuchi includes spaced-apart rails that are attached to the roof and extend the full length down the slope of the roof. However, the system disclosed in Tomiuchi is secured by fasteners that are tightened from above the solar modules which requires an installer to clamber over the solar modules which can cause damage thereto.

Japanese Patent Application, JPH1150621 (AOYAMA) discloses roof panels with the solar cells or solar cell modules being held at the edge section of a longitudinally extending rail in a waterproof configuration. The system disclosed in AOYAMA, also requires tightening at multiple locations along the longitudinally extending rail from either above or below the solar cell modules.

PCT Application PCT/US2016/044717 (TING), attempts to inhibit water ingress by use of a pressurised air gap. This is potentially problematic and may not provide an adequately watertight integrated solar panel roof system.

US Patent Application Nos 2016/0043686 and 2016/0134229 (both in the name of HSUEH), teach a watertight roof assembly integrated with solar modules to be used to construct a roof of a building. The roof assembly includes a plurality of support units to which the solar modules are attached. However, both patent applications disclose attachment means that are accessed from above the structure which requires the installer to clamber over the solar modules that may lead to damage thereof.

The reader should appreciate that the term watertight or waterproof used throughout the specification should be given the meaning that the roof structure is configured to substantially prevent passage of water or moisture therethrough.

It is an object of the present invention to provide an apparatus for joining solar array panels to form a roof structure. It is another object of the present invention to overcome at least some of the aforementioned problems or at least provide the public with a useful alternative.

It should be appreciated that any discussion of the prior art throughout the specification is included solely for the purpose of providing a context for the present invention and should in no way be considered as an admission that such prior art was widely known or formed part of the common general knowledge in the field as it existed before the priority date of the application.

SUMMARY OF THE INVENTION

In one aspect of the invention, but not necessarily the broadest or only aspect, there is proposed a roof structure, comprising:

a support member;

a plurality of elongate rail members connectable to the support member;

at least two solar array panels positioned intermediate of the plurality of elongate rail members; and respective elongate capping members movably connected to each of the plurality of elongate rail members, the elongate capping members being adjustable such that each elongate capping member clamps a solar array panel or panels to a corresponding elongate rail member, wherein each elongate capping member is adjustable from a single location along the corresponding elongate rail member.

Preferably, the solar array panels having an edge or edges supportable on a part of a respective elongate rail member.

Preferably, the clamping provides a generally watertight connection, between the solar array panels and the elongate capping member/elongate rail member.

Preferably, the plurality of elongate rail members being connectable to the support member in a generally parallel arrangement, wherein the solar array panels can be slid in therebetween from one end, whereafter the elongate capping member can be adjusted to clamp the panels down onto the elongate rail member.

In one form the elongate capping member is adjusted from an end of a corresponding rail member, wherein an end cap is configured to cover the adjustable fixing member or parts thereof, once the elongate capping member has been tightened.

This also means that if a solar panel needs to be removed for repair or replacement, the end cap can be removed and the adjustable fixing member moved to raise the elongate capping member to permit removal of the solar panel or panels.

The support member may be a frame or wall of a building or other structure. The support member in one form comprises a plurality of purlins and rafters supported on a wall structure. In another form the elongate rail members may be supported on a freestanding frame that does not include walls, such as a post of a carport structure or shade.

Preferably each elongate capping member includes a seal or seals. In one form a seal depends from an underside of a sidewardly projecting wing of the capping member to thereby bear against an upper surface of a solar array panel. In a preferred form flanges extend out either side of the elongate capping member and extending along the length thereof.

In one form the elongate rail member includes longitudinally extending voids that can act as water channels or to run cabling therealong.

The elongate capping member is preferably adjustable by way of an adjustment mechanism that are used to fasten the elongate capping member to a respective elongate rail member. The adjustment mechanism may be a worm drive, rack and pinion, cables/wires, shaft, rod, or plurality of sliding blocks that are actuated by a drive mechanism. In one form the adjustment mechanism comprises a worm drive shaft, worm drive portion, worm drive housing, and a threaded rod with generally square-shaped head, whereby the threaded rod engages the worm drive or an intermediate member to cause the head to rise and lower relative to the worm drive housing. In the immediately preceding form the worm drive housing is connected to the elongate rail member and the head is attached to the elongate capping member, wherein rotation of the worm drive in one direction causes the elongate capping member to be drawn down onto the elongate rail member, and rotation in the opposite direction causes the elongate capping member to move upwardly.

The worm drive, rack, shaft, rod or drive mechanism are preferably parallel to the length of the elongate rail member and at least partly retained therewithin.

In another aspect of the invention, there is proposed an apparatus used for holding solar array panels, comprising:
an elongate rail member;
an elongate capping member movably connectable to the elongate rail member, the elongate capping member being adjustable for clamping the solar array panels therebetween;
a plurality of interconnected adjustment devices, spaced apart along a length of the elongate rail member, being configured to move the elongate capping member in a generally vertical direction, relative to the elongate rail member; and
a drive mechanism configured to control the movement of the adjustment devices to affect the clamping, wherein the drive mechanism being adjustable from a single location along the elongate rail member.

The adjustment devices and drive mechanism may be positioned within a longitudinally extending passageway in the elongate rail member. The drive mechanism may include an adjustment nut, which is held in place relative to a cover plate, by way of a stabiliser plate that engage a groove on a threaded rod adjoining the adjustment nut.

Preferably, a plurality of adjustment devices are spaced apart along the length of the elongate rail member and are connected by way of joining rods. In this way the drive mechanism can be adjusted from a single location along the elongate rail member, to thereby clamp the elongate capping member down onto the top of solar array panels abutting or adjacent a side or sides thereof.

The adjustment devices may each comprise an adjustment block having a generally vertical channel that intersects a perpendicular channel that is generally oblique to a horizontal plane. Preferably a sliding nut is positioned within the channel and is connected to a generally vertically extending bolt that extends through the vertical channel and a slot in the top of the elongate rail member, wherein an upper end of the bolt is connectable to a clamping nut. Each clamping nut of a respective adjustment device engages a groove in an underside of the elongate capping member.

The respective ends of the threaded rod and joining rods each include an aperture, wherein the ends of the rods are configured to slot into respective sides of the adjustment blocks and held in place by pins that engage through pin receiving apertures in the adjustment blocks and through the aperture in the threaded rod or joining rods.

In one form a blank is connectable to one side of the elongate capping member, on a side of the elongate rail member, being opposite to that which the solar array panels are connected.

In one of form a single rotation device or drive mechanism is used to expand/reduce the height of the capping member, wherein the single rotation means may be operated from a single location along the elongate rail member, such as an end of the rail. The reader will appreciate that the single rotation means or drive mechanism may be configured to operate multiple height expansion units/adjustment devices along the length of the elongate rail member. The apparatus may use multiple, transverse rotation devices to expand/reduce height of the elongate capping member.

In still another aspect of the invention there is proposed a method of forming a roof structure, including the steps of: constructing a frame or walls to hold the roof structure; attaching a support member or members to the frame or walls;
connecting at least two elongate rail members to the support member or members in a generally parallel arrangement, each of the elongate rail members having a respective elongate capping member adjustably connected thereto;
positioning at least two solar array panels between the parallel elongate rail members, wherein the at least one solar array panel is supported on a part of the elongate rail members; and
tightening the respective elongate capping members from a single location along the elongate rail member, such that they bear down on an upper surface of the solar array panels to thereby clamp the panels therebetween.

In one form the elongate capping members provide a generally watertight connection between the solar array and respective elongate rail members.

BRIEF DESCRIPTION OF THE DRAWINGS

The accompanying drawings, which are incorporated in and constitute a part of this specification, illustrate by implementation of the invention and, together with the description and claims, serve to explain the advantages and principles of the invention. In the drawings.

FIG. 21a is an end view of the rail assembly of FIG. 14, illustrating the elongate capping member is a retracted position;

FIG. 21b is an end view of the rail assembly of FIG. 21a with end cap removed;

FIG. 22 is a partial cross-sectional view through A-A of FIG. 21a;

DETAILED DESCRIPTION OF THE ILLUSTRATED AND EXEMPLIFIED EMBODIMENTS

Figure 1:
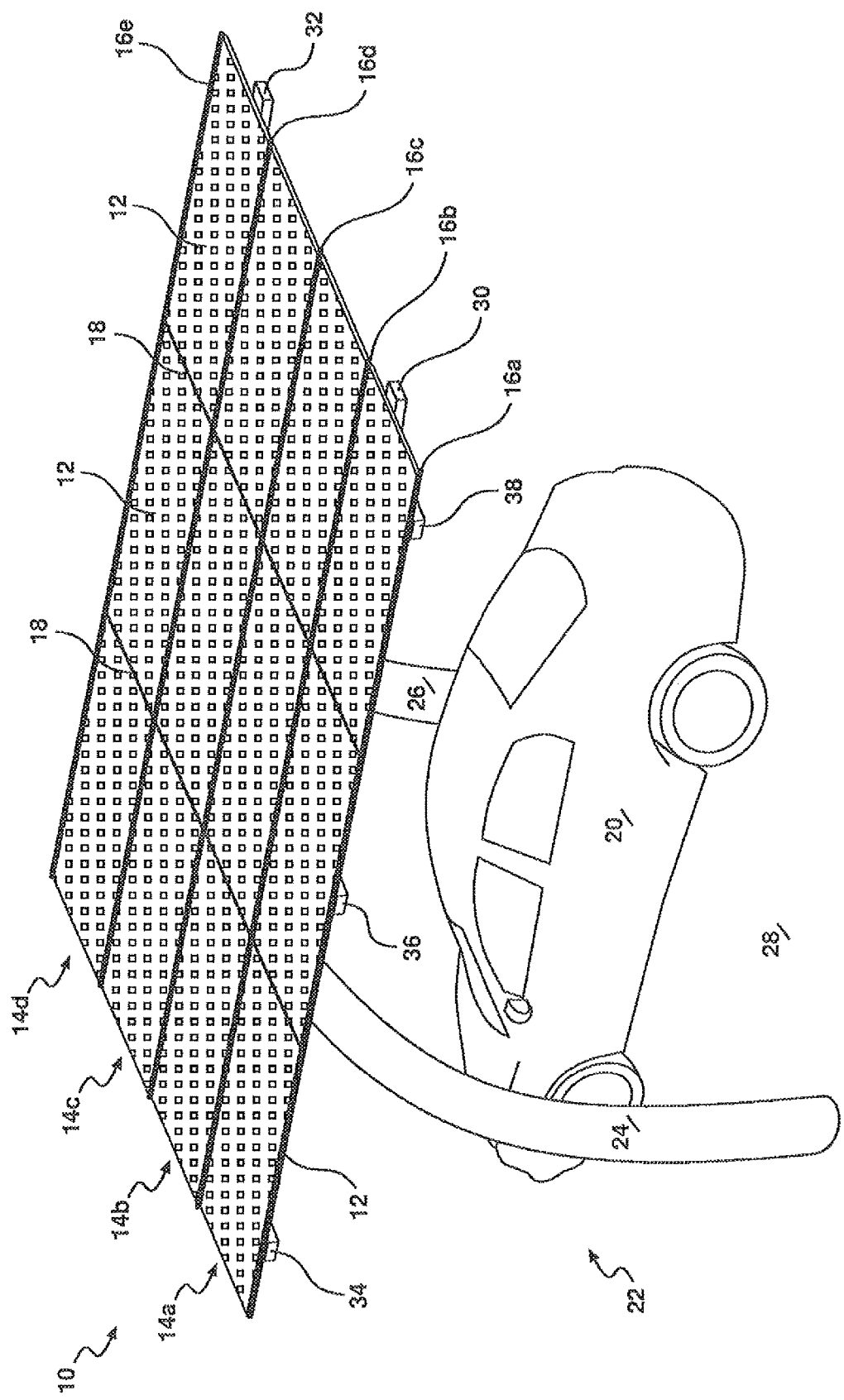
FIG. 1 is a perspective view of one embodiment of the roof structure of the present invention.

Similar reference characters indicate corresponding parts throughout the drawings. Dimensions of certain parts shown in the drawings may have been modified and/or exaggerated for the purposes of clarity or illustration. The phrases 'rail assemblies' and 'rail assembly' used throughout the description refers to the assembled elongate rail member, elongate capping member and other associated components.

Referring to the drawings for a more detailed description, there is illustrated a roof structure 10 comprising a plurality of solar array panels 12, demonstrating by way of examples, arrangements in which the principles of the present invention may be employed.

FIG. 1 illustrates a roof structure 10 comprising four rows 14a, 14b, 14c, 14d, of solar array panels 12, which are positioned intermediate of parallel rail assemblies 16a, 16b, 16c, 16d, 16e. The roof structure 10 further includes joining members 18, that extend along the junction between adjacent solar array panels 12 of a row. When assembled the solar array panels, rail assemblies and joining members provide a generally watertight or waterproof surface that can be used for buildings or other structures, such as a carport, veranda or shade.

In the present example, the roof structure 10 is illustrated as being constructed as a shelter for a car 20, however the reader will appreciate that the roof could be used for a house or other form of building where it is important that water is inhibited from entering a roof cavity or interior of the building.

In the present embodiment, the roof structure 10 is connected to a support member 22, in the form of two curved posts 24, 26 that are set in ground 28, and are connected to a respective rafter 30 or 32. Purlins 34, 36, 38 are attached to and extend across rafters 30, 32. The parallel rail assemblies 16a, 16b, 16c, 16d, 16e are attached to the purlins 34, 36, 38 by way of brackets 40, shown in FIG. 4.

The reader will appreciate that this is only one embodiment of the support member 22 and other types are possible without departing from the scope of the invention. For instance, the rafters or purlins may be supported on a wall or attached to a ridge board.

Figure 2:
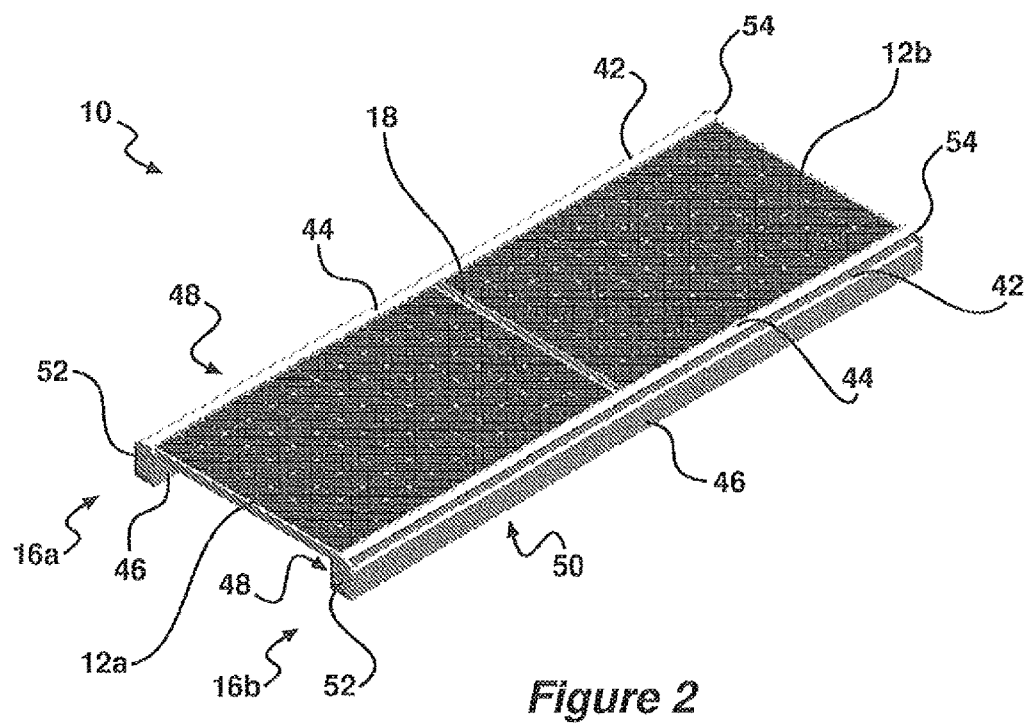
FIG. 2 is a partial view of the roof structure of FIG. 1 illustrating a row of two adjacent solar panels positioned intermediate of two parallel rail assemblies.
Figure 3:
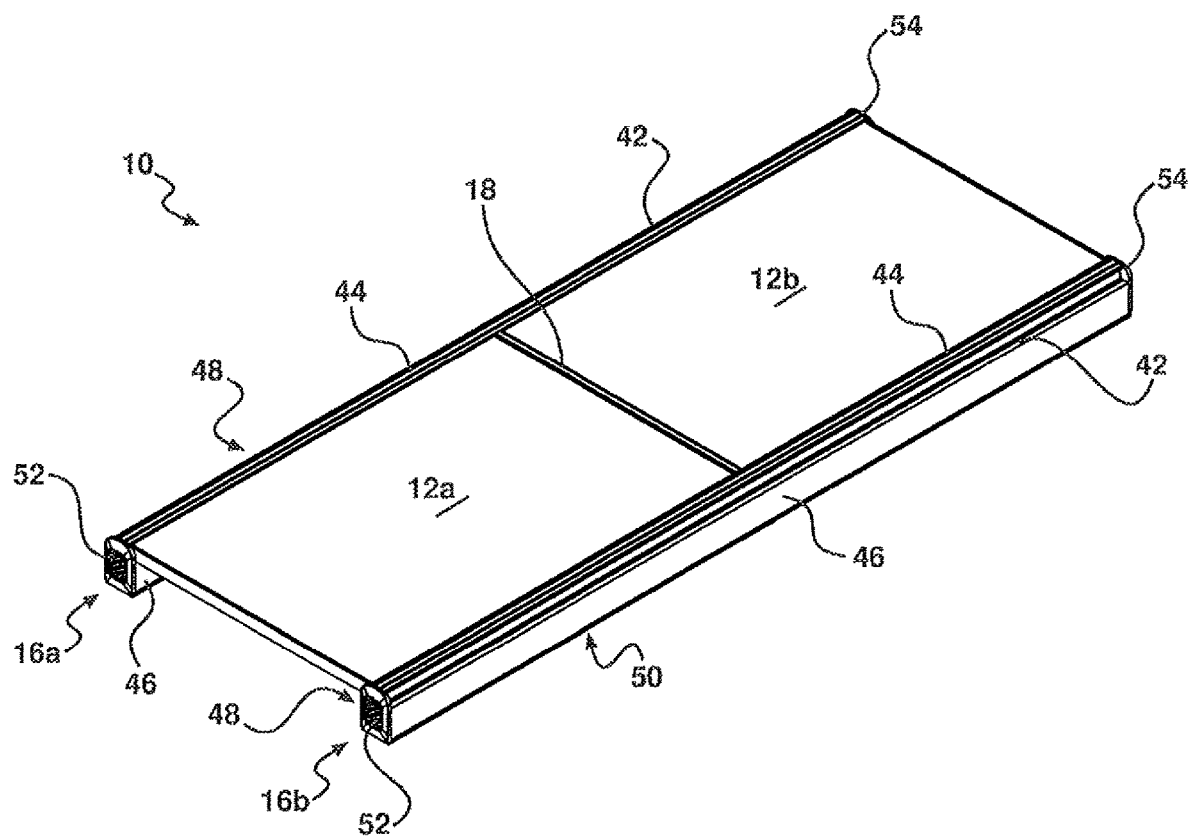
FIG. 3 is a simplified perspective view of the solar panels and two parallel rail assemblies of FIG. 2.

FIGS. 2 and 3 illustrate two rail assemblies 16a, 16b and two solar array panels 12a, 12b positioned therebetween, wherein a joining member 18 is located between the adjacent panels 12a, 12b. FIG. 2 illustrates an actual appearance of the roof structure, whereas FIG. 3 illustrates a simplified version of the section of the roof structure to assist with the description thereof.

Figure 4:
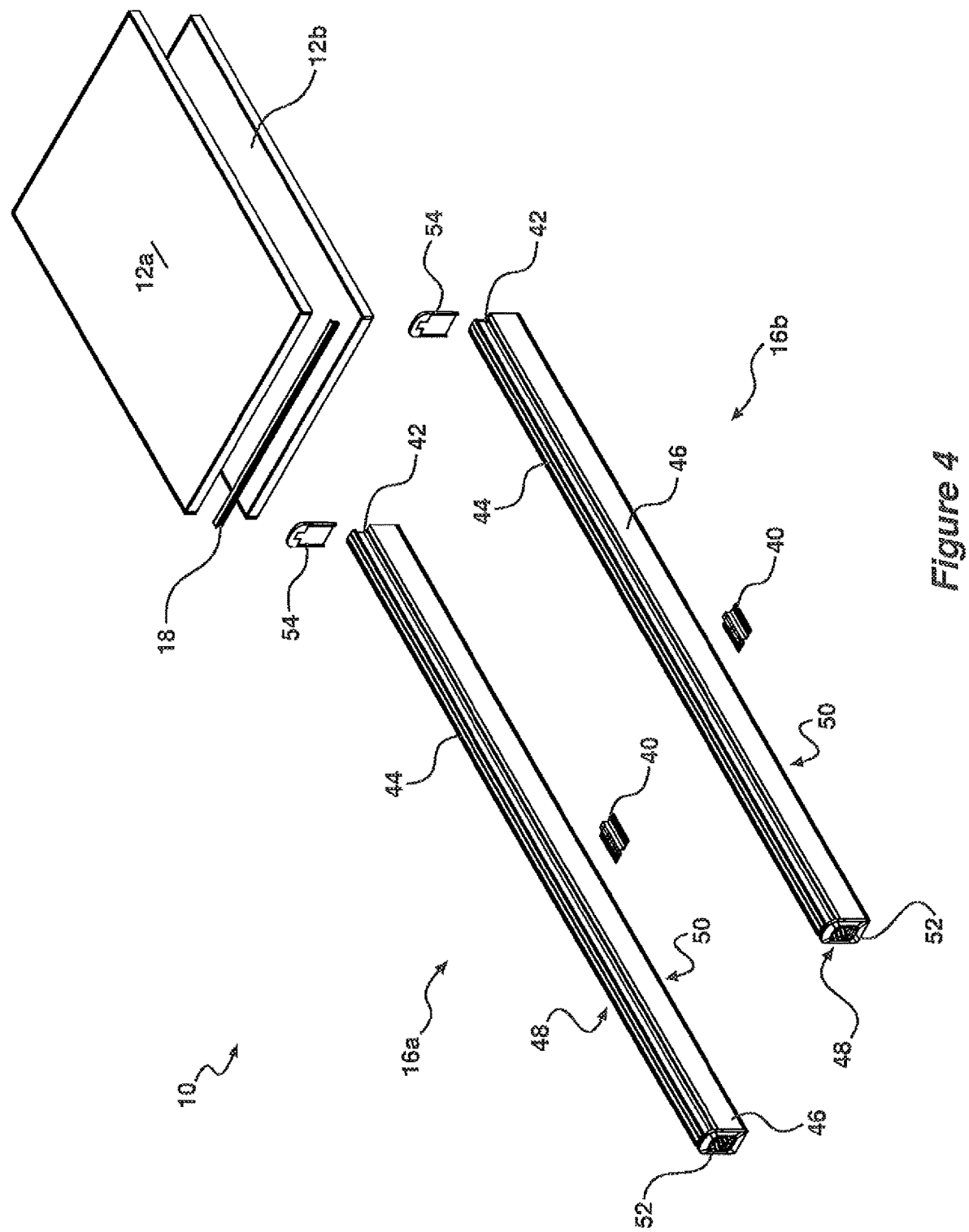
FIG. 4 is a partial exploded view of FIG. 3 illustrating the solar panels, rail assemblies, joining members, end caps and fixing brackets.

Each of the rail assemblies 16a, 16b comprise an elongate rail member 42, an elongate capping member 44, side covers 46, 48, underside cover 50, end caps 52, 54, and brackets 40, as illustrated in FIG. 4.

Figure 5:
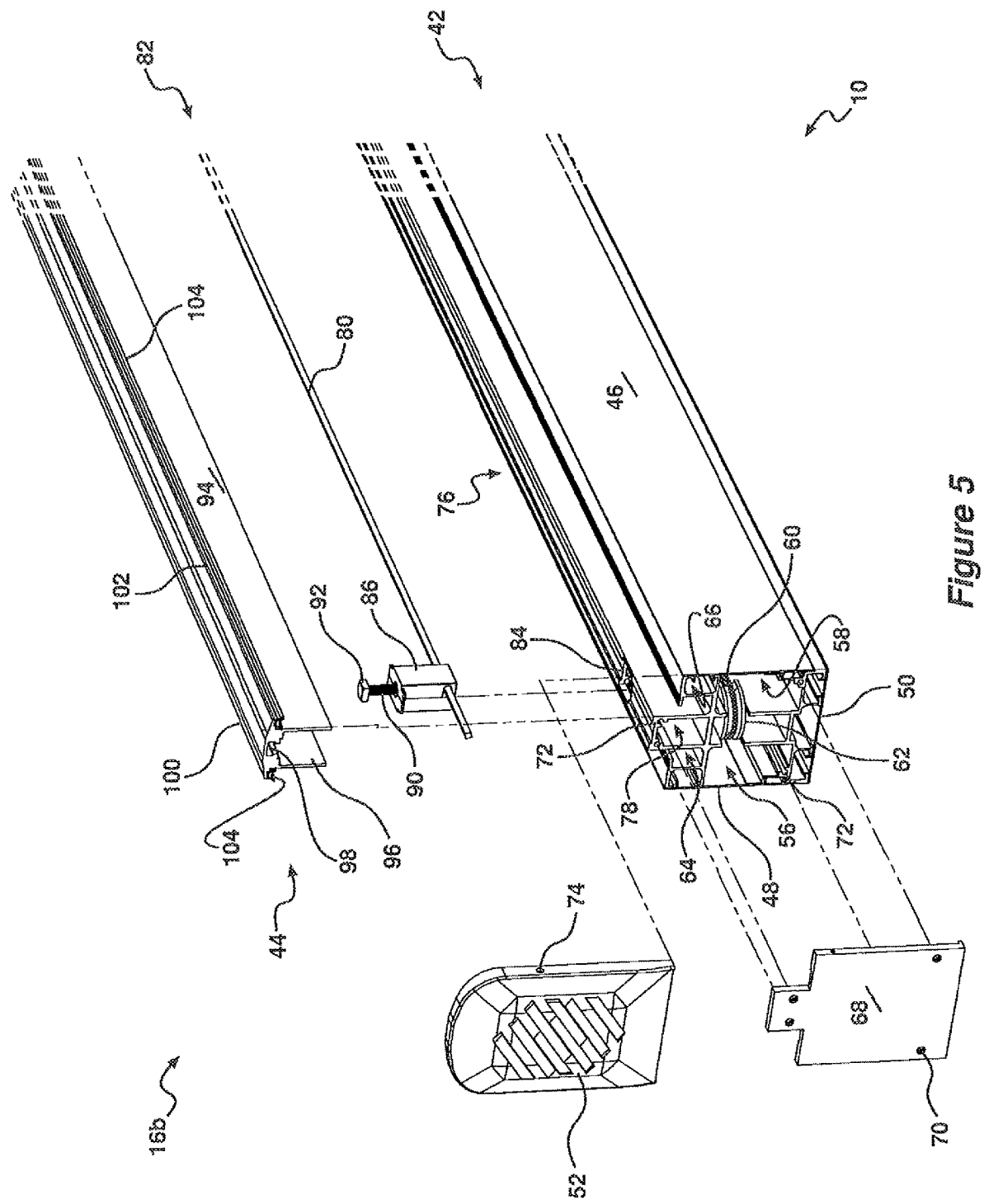
FIG. 5 is an exploded view of an end of one of the rail assemblies of FIG. 4, illustrating the elongate rail member, end cap, end plate, elongate capping member, adjustable fixing member and worm drive shaft.

FIG. 5 illustrates an exploded view of the rail assembly 16b illustrating the various components. It should be appreciated that all the rail assemblies will be substantially identical and the discussion in relation to rail assembly 16b also relates to all other rail assemblies in the roof structure 10 of the present embodiment.

As illustrated in FIG. 5 the elongate rail member 42 comprises an extrusion, to which covers 46, 48 and 50 are attached. The side covers 46, 48 enclose channels 56, 58 through which electrical cables 60 are configured to pass. In this way, the electrical cables 60 for the solar array panels 12 are able to be concealed within the structure of the roof and can be accessed by removing an appropriate cover on an elongate rail member 42. The end of the extrusion includes a curved guide 62 that inhibits damage to the cable 60 as it passes between channels 56 and 58.

The elongate rail member 42 further includes upwardly open channels 64, 66 for receiving any condensation or moisture that passes between the edge of the solar array panel 12 and the elongate rail member 42. Although not illustrated, the joining members 18 may also include channels for receiving any moisture that is able to get through between the solar array panel 12 and the joining member 18. The channels of the joining members 18 are configured for fluid communication with channels 64, 66 such that any moisture that is able to work its way down through the roof structure is directed along channels to an end of the elongate rail member 42, where it can be suitably directed down the outside of the building. The moisture is also kept isolated from the cables 60 in channels 56, 58.

A cover plate 68 is fixed over the end of the elongate rail member 42 by way of screws 70, that engage through apertures 71 in the cover plate 68 into voids 72 in the extrusion. The end cover 52 is then configured to slide over the cover plate 68 and be fixed in place by screw 74.

The skilled addressee will appreciate that a drive mechanism 75 can be used to adjust multiple tightening devices, spaced-apart along the length of the elongate rail member 42. In this way the elongate capping member 44 can be clamped down onto the top of the solar panels 12 at multiple locations therealong.

Figure 6:
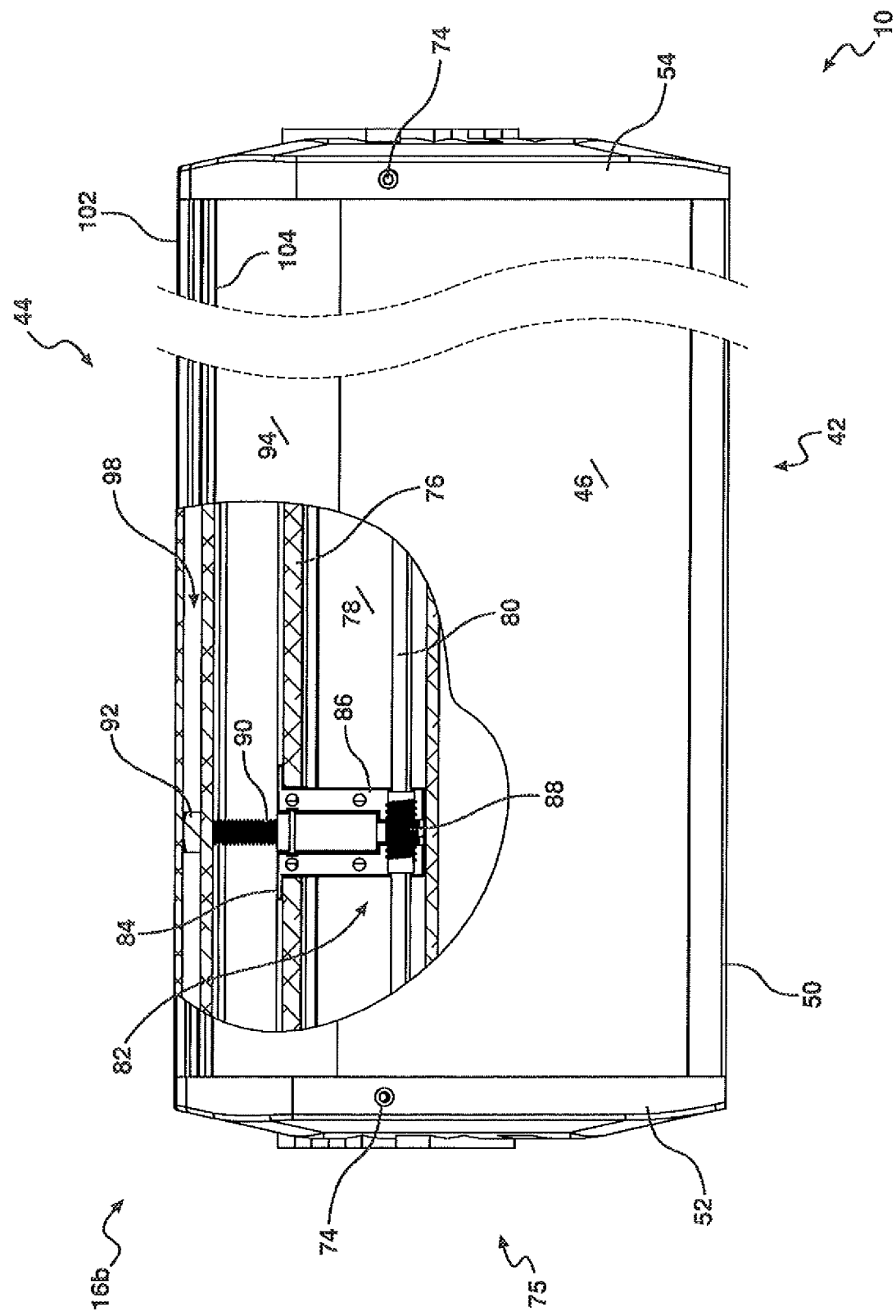
FIG. 6 is a partial cross-sectional view of one of the rail assemblies of FIG. 4, illustrating the adjustable fixing member positioned within the elongate rail member and engaging the elongate capping member.

A generally rectangular shaped upstand 76 is located between the upwardly open channels 64, 66 and is configured to engage the elongate capping member 44. The upstand 76 includes a longitudinally extending passageway 78, wherein the worm drive shaft 80 of the worm drive assembly 82 extends therealong. The worm drive shaft 80 has a generally square cross-sectional profile. A slot 84 is located through the top of the upstand 76 to accommodate a worm drive housing 86 containing the worm drive 88, as shown in FIG. 6. As further illustrated in FIG. 5 a threaded rod 90 extends upwardly from the worm drive housing 86. The rod 90 having a generally square shaped head 92 at an upper end.

The elongate capping member 44 has a generally inverted U-shaped cross-sectional profile whereon the downwardly extending sides 94, 96 are configured to extending downwardly over the upstand 76. A groove 98 extends longitudinally along an inner surface of the elongate capping member 44 and is configured to capture head 92 therein. Flanges 100, 102 extend outwardly from opposite sides of the elongate capping member 44 for engaging with an upper surface of a respective solar array panel 12. The flanges 100, 102 include respective depending seal members 104 that are configured to inhibit water ingress between the underside of the wing and the upper surface of the solar array panel to thereby provide a generally watertight connection.

FIG. 6 illustrates the assembled rail assembly 16b, which may be of any desired length. The skilled addressee should appreciate that as the worm drive shaft 80 is rotated in a first direction, the worm drive 88 is caused to rotate, which thereby causes the threaded rod 90 to moved upwardly. The head 92 that is retained within groove 98 therefore drives the elongate capping member 44 upwards. When the worm drive shaft 80 is rotated in the opposite direction the worm drive 88 causes the threaded rod 90 to retract inwardly of the worm drive housing 86 thereby drawing the elongate capping member 44 downwardly, such that the flanges 100, 102 bear against an upper surface of respective solar array panels 12a, 12b.

Figure 7:
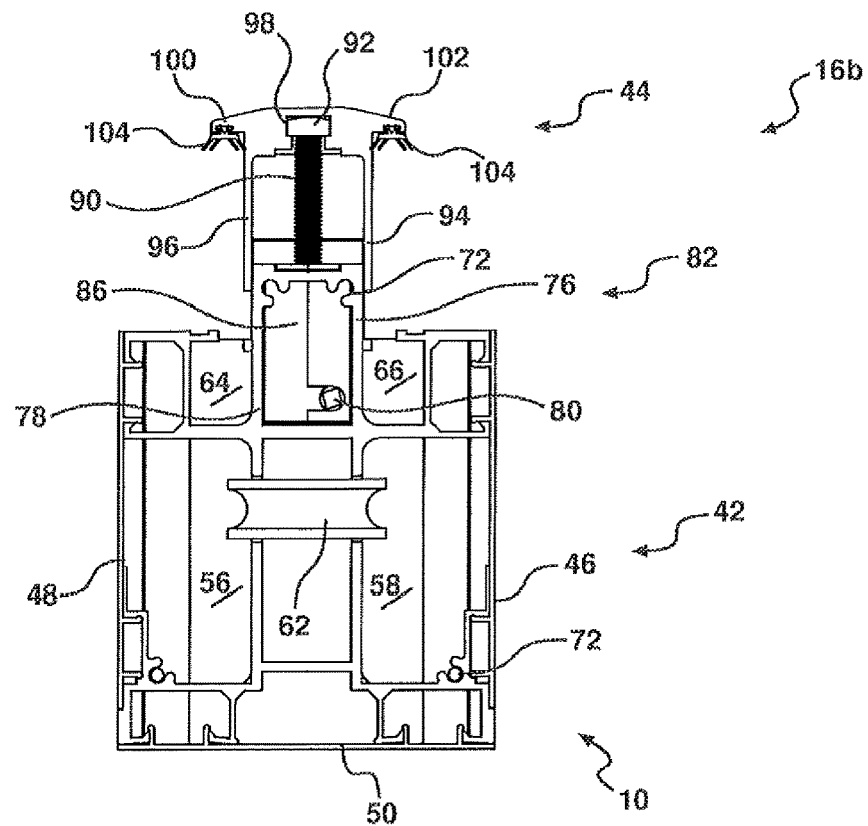
FIG. 7 is an end view of the rail assembly of FIG. 5, illustrating the elongate capping member in a first or extended position to thereby allow positioning of the solar array panel/s.
Figure 8:
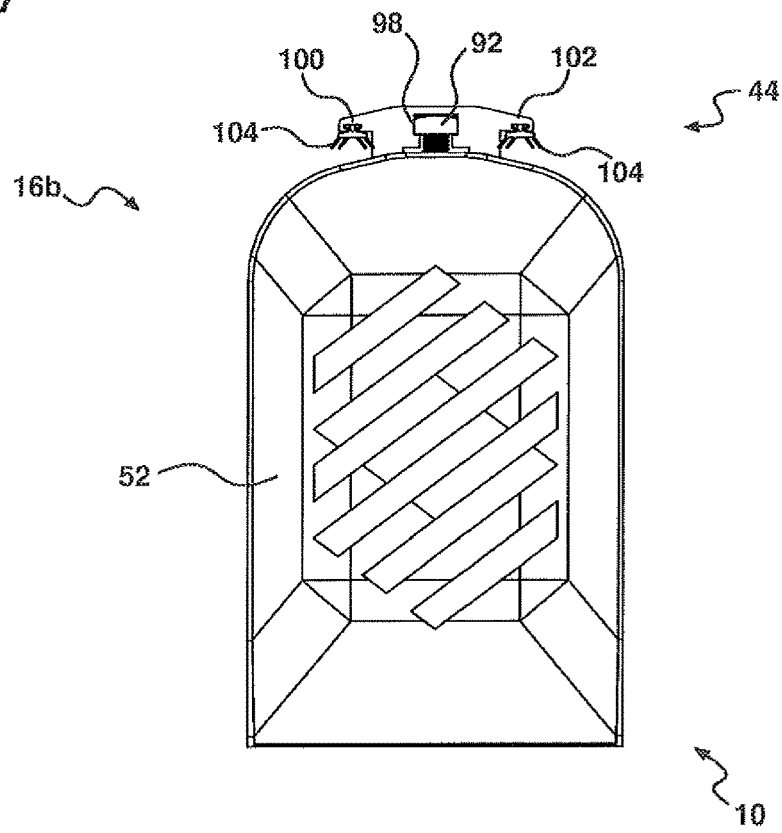
FIG. 8 is an end view of the elongate rail member of FIG. 7, with end cap attached showing the relative position of the elongate capping member when in the first or extended position.

FIGS. 7 and 8 illustrate the elongate capping member 44 in a first or extended positioned. This position allows for the locating of the solar array panels 12 on either side, with respect to rail assemblies 16b and 16c, and on one side, with respect to rail assemblies 16a and 16d. FIG. 8 illustrates the relative position of the elongate capping member when in the first or extended positioned, however, the reader will appreciate that the end cap 52 is only attached once the elongate capping member 44 is clamped onto the edge of the solar panel array 12 since the end cap 52 conceals the end of worm drive shaft 80.

Figure 9:
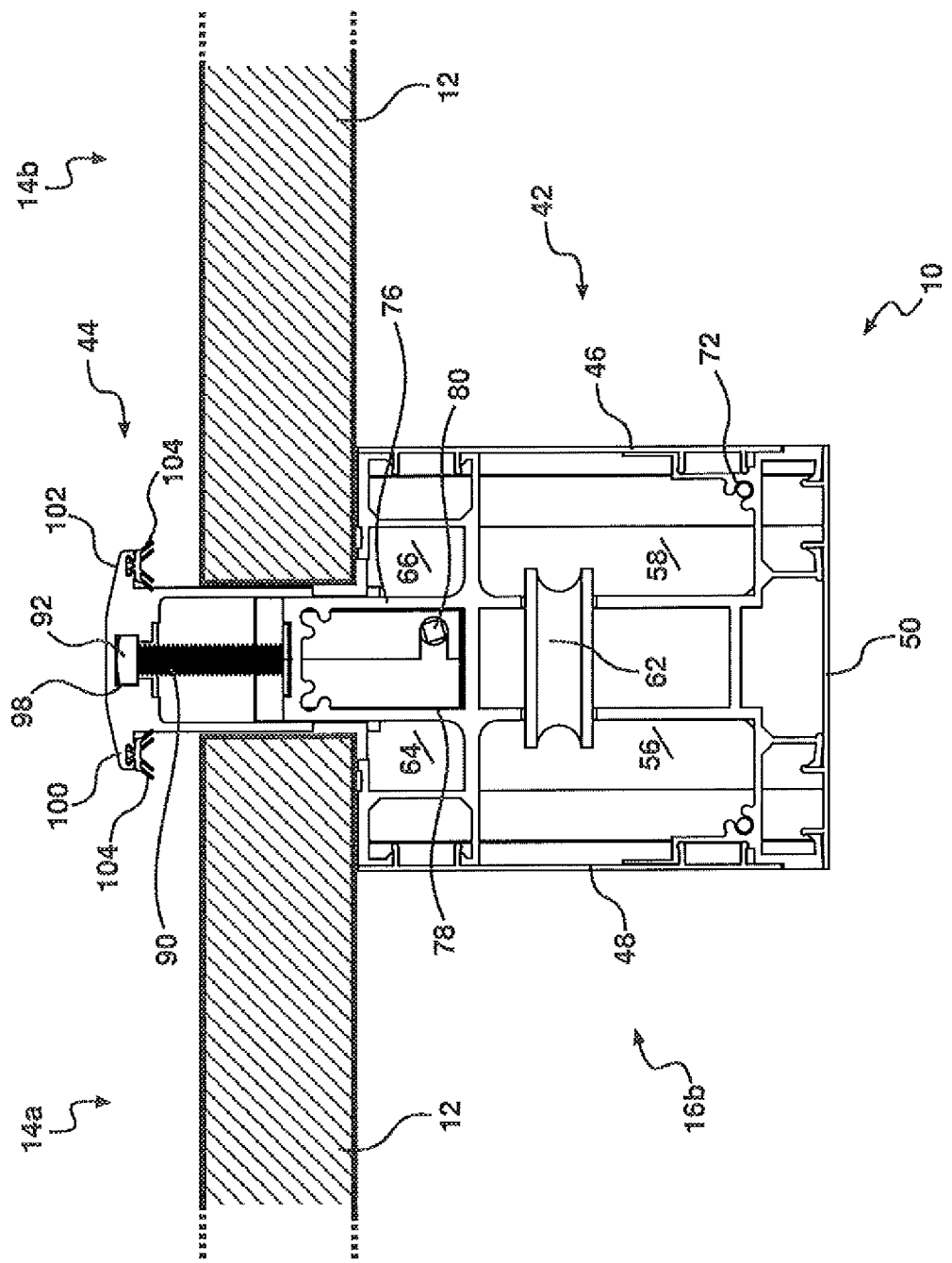
FIG. 9 is an end view of the rail assembly of FIG. 7, illustrating the placement of the solar array panels onto the elongate rail member.
Figure 10:
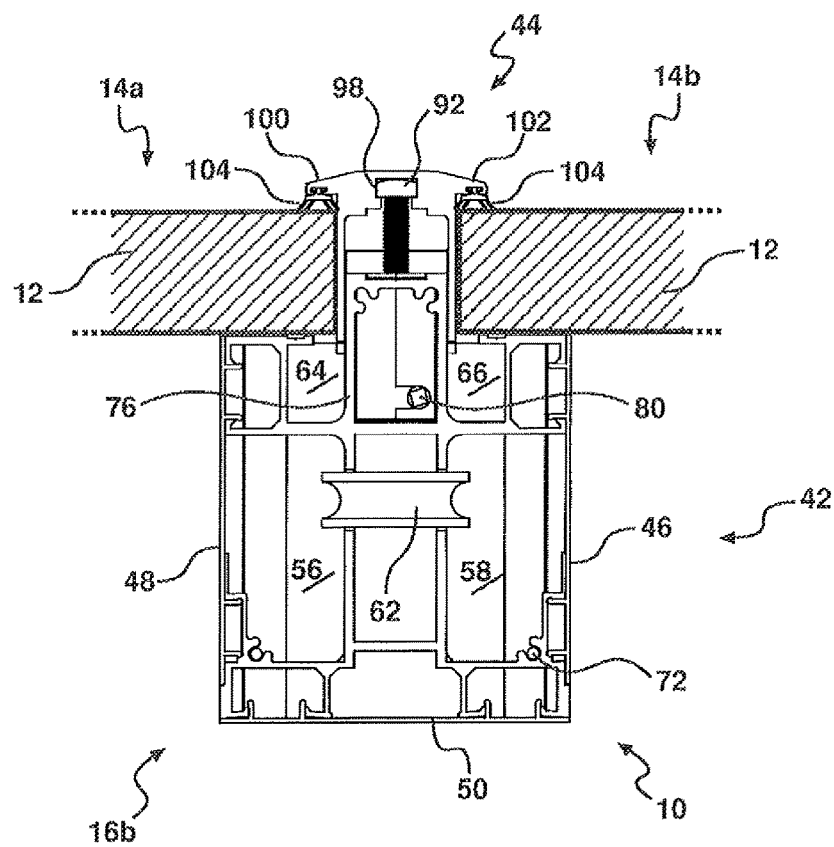
FIG. 10 is an end view of the rail assembly and solar array panels of FIG. 9, illustrating the elongate capping member in a second or retracted position thereby clamping the solar array panels to the elongate rail member.
Figure 11:
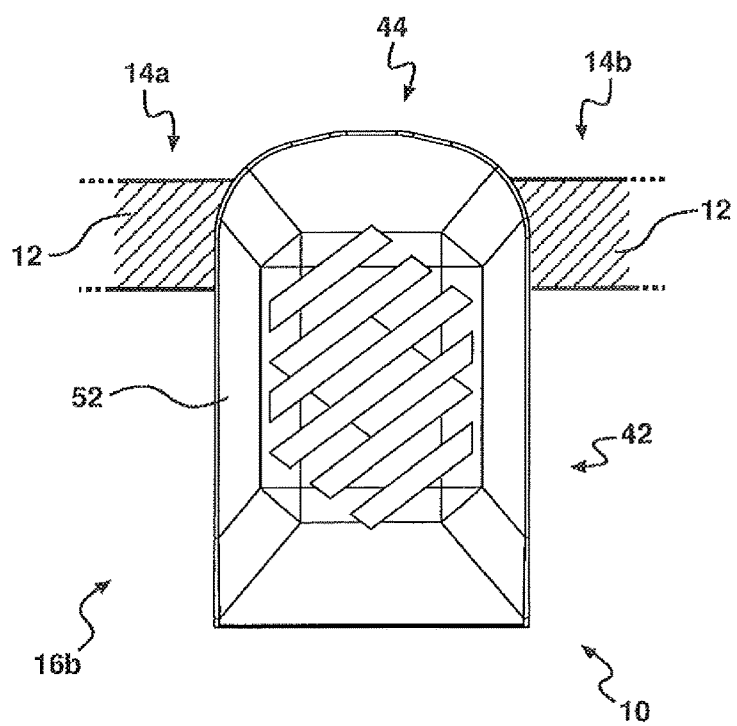
FIG. 11 is an end view of the rail assembly of FIG. 10, with the end cap attached.

FIG. 9 illustrates the placement of the solar array panels 12 on either side of rail assembly 16b. As the reader will now appreciate an installer will then lower the elongate capping member 44 by way of the worm drive shaft 80, such that flanges 100, 102 and respective seals 104 bear down on the top of respective solar panels 12, as illustrated in FIG. 10. FIG. 11 illustrates the end cap 52 attached wherein the top of the elongate capping member 44 is below or in line with the top of the end cap 52.

Figure 12:
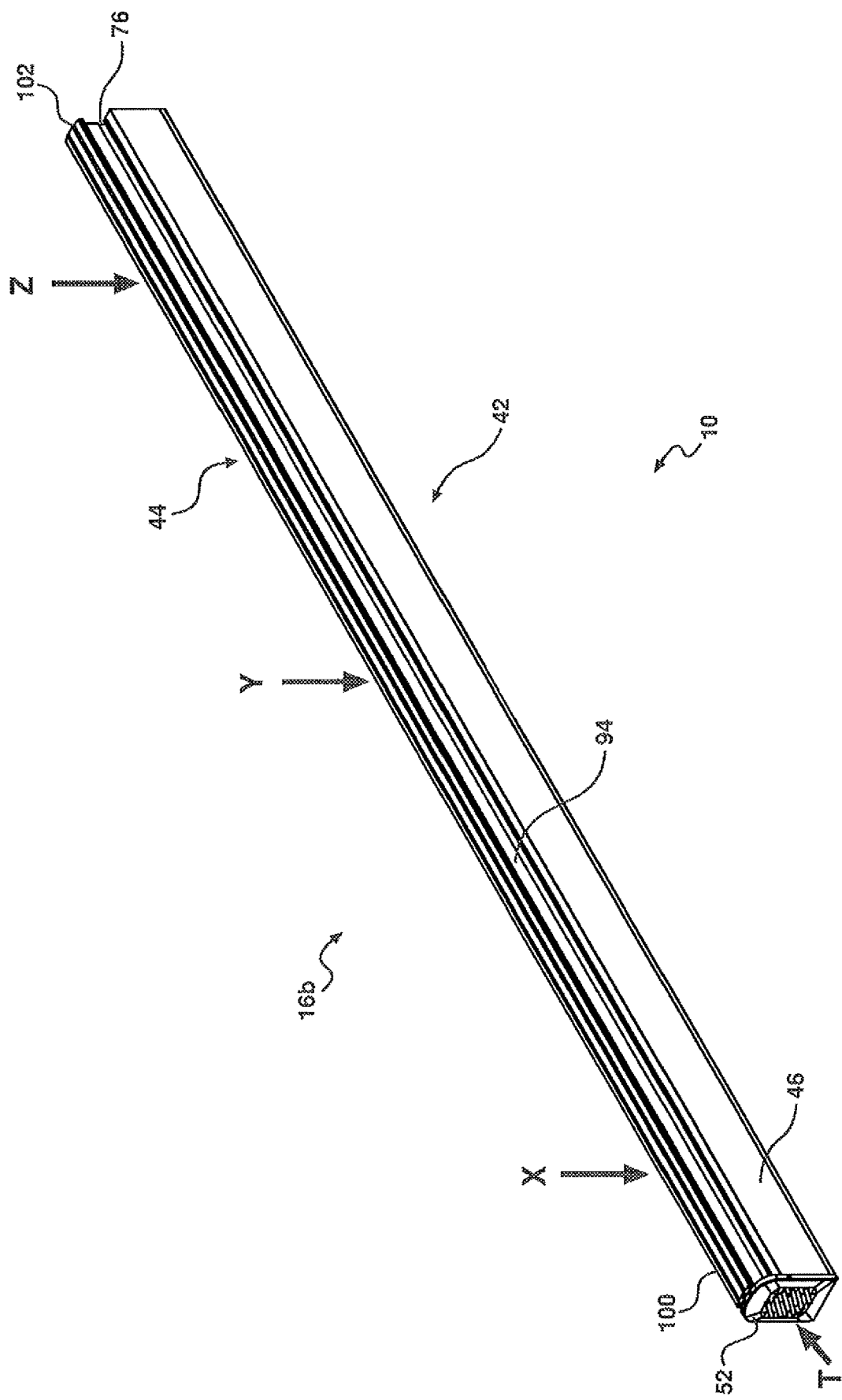
FIG. 12 is a perspective view of the rail assembly of FIG. 6, illustrating possible locations (X, Y, Z) of the adjustable fixing units and the location (T) at which they can be adjusted by way of a worm drive shaft.

As illustrates in FIG. 12, the adjustable fixing units comprising a respective worm drive housing 86, worm drive 88, threaded rod 90 and head 92, may be positioned at regular intervals along the rail assembly 16b. In the present example three adjustable fixing units are located at positions X, Y and Z. All of these units are adjusted from a single location along the rail assembly 16b, namely location T, when the end cap 52 is removed.

In this way, with the present embodiment, an installer is able to tighten the elongate capping member 44 along its entire length from a single position, such as from the end of the elongate rail member 42. This ensures that the installer is not required to scramble over the roof surface to tighten numerous fixing means, which therefore reduces the risk to damage of the solar array panels 12 during installation. The installer is also, with the present embodiment, not alternatively required to tighten multiple fasteners from an underside of the roof structure where they are not able to observe the surface of the roof structure and wherein it is possible for the installer to overtighten the fixing means that may lead to damage of the solar array panels because the upper surface is out of sight.

The skilled addressee will however appreciate that the tightening device/s may differ from the present embodiment and may comprise a cables or wires or be in the form of a rack and pinion device that can be tightened from one location along the rail assembly. Furthermore, although preferably tightened from one end it should be appreciated that the tightening device/s could be adjusted from any location along the length of the rail assembly.

Figure 13:
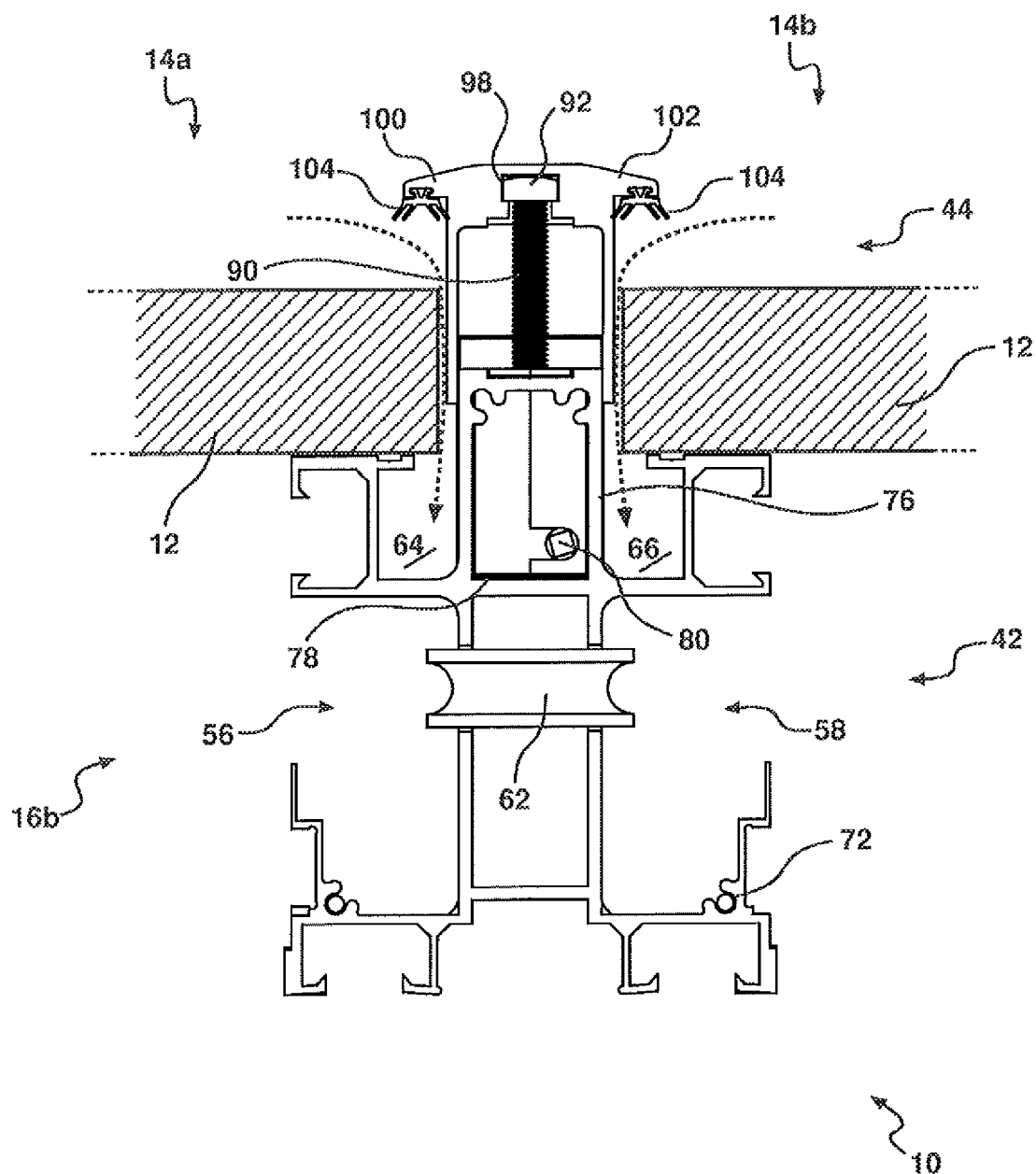
FIG. 13 is an end view of the of the rail assembly of FIG. 7 with covers removed illustrating the longitudinally extending voids that can be used to accommodate cabling or to be used as a channel to direct water therealong.

FIG. 13 illustrates the longitudinally extending voids 56 and 58 that can be used to accommodate cabling, as was previously discussed with respect to FIG. 5, and the channels 64 and 66 that can be used to capture and direct any water therealong, which enters between the solar array panels 12 and elongate capping member 44, as indicated by the broken arrows.

Figure 14:
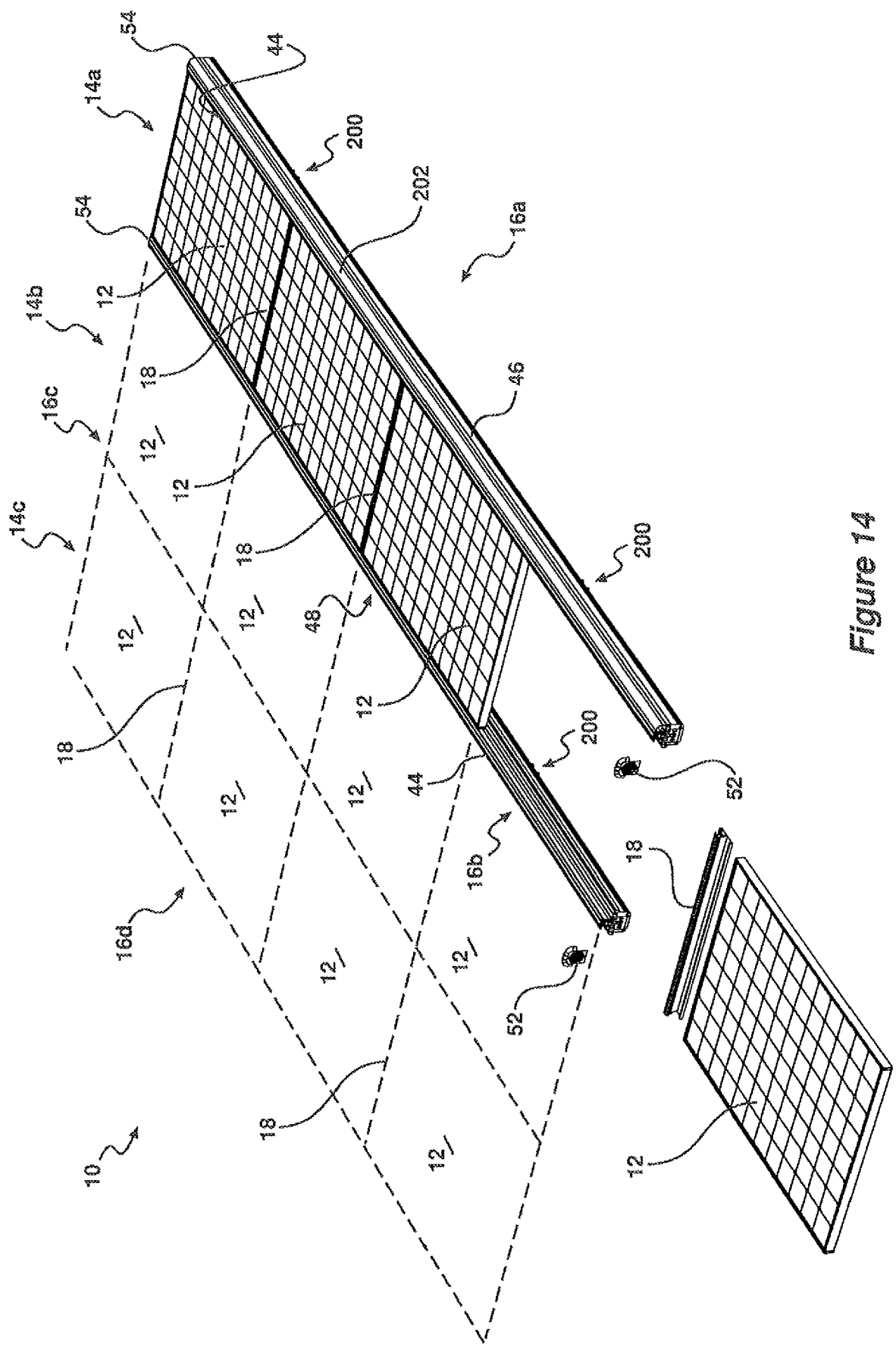
FIG. 14 is a perspective view an alternate embodiment of the roof structure and parallel rail assemblies, illustrating placement of solar panels therebetween.

FIGS. 14 to 25 illustrate an alternate embodiment of the rail assemblies 16 used to form the roof structure 10. In the present embodiment the roof structure 10, as illustrated in FIG. 14, includes three rows 14a, 14b, 14c of solar panels 12. The two rail assemblies 16a, 16b illustrate the mounting brackets 200 connected to an underside thereof. As further illustrated in FIG. 14, the rail assembly 16a on the edge of the roof structure 10 includes a blank 202 that is connected opposite the solar panels 12.

Figure 15:
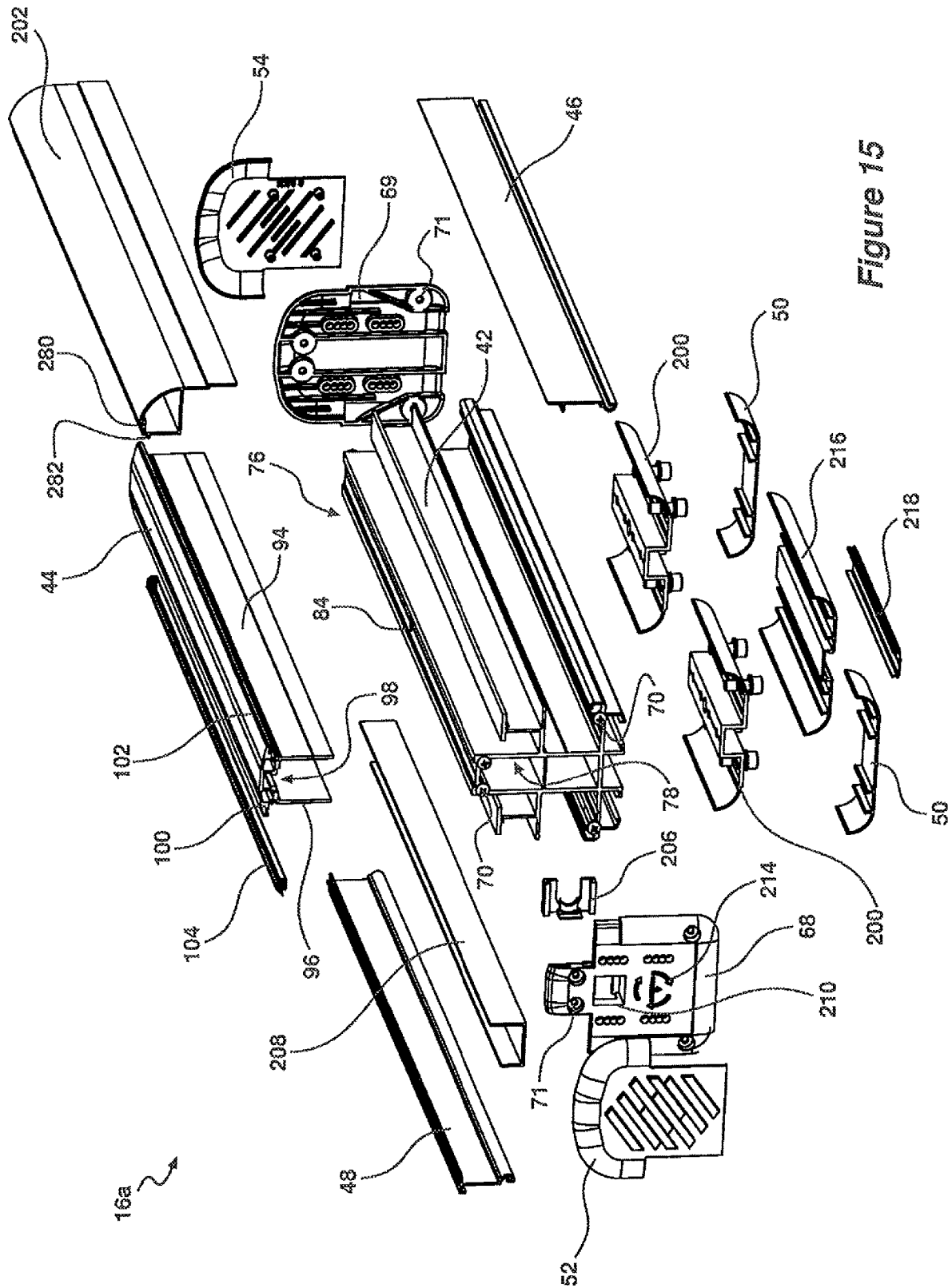
FIG. 15 is an exploded view of one of the rail assembly of FIG. 14.

Turning to FIG. 15, there is illustrated an exploded view of the different components of the present embodiment of the rail assembly 16a. The elongate rail member 42 extrusion includes the longitudinally extending passageway 78 through which the drive mechanism 75 extends, and which is dimensioned to accommodate the adjustment devices 204, that are spaced-apart along the passageway 78, as illustrated in FIG. 22.

FIG. 15 further illustrates one of the slots 84 in the upstand 76, through which a part of an adjustment device 204 extends to engage with the elongate capping member 44, as will be discussed with respect to FIGS. 16 to 18.

Figure 25:
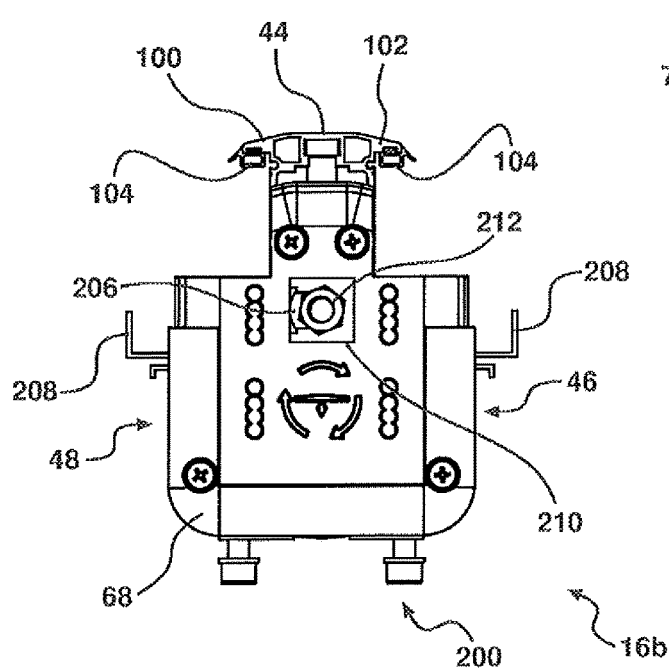
FIG. 25 is an end view of one of the intermediate rail assemblies of FIG. 14 with end cap removed.

Turning back to FIG. 15, the rail assembly 16a further includes the blank 202, cable tray side covers 46, 48, cover plates 68, 69, end caps 52, 54, mounting brackets 200, underside covers 50, seal 104, adjustment nut stabiliser plate 206 and gutter 208. The skilled addressee will appreciate that FIG. 15 illustrates a side rail assembly 16a, with the blank attachable to an outer edge of the roof surface. However, where the rail assembly 16 is located intermediate of rows of solar panels 12 (i.e. 16c in FIG. 14) a gutter 208 may be positioned on either side of the rail assembly 16, as illustrated in FIG. 25.

The cover plates 68, 69 in the present embodiment both include apertures 71 for attachment to the rail assembly 16 by way of screws 70. However, the cover plates 68, as illustrated in FIG. 15, also includes a generally square hole 210 extending therethrough for permitting access to the adjustment nut 212. The outer surface of the cover plates 68 further includes markings 214 for indicating the direction to turn the adjustment nut 212 to raise or lower the elongate capping member 44.

The rail assembly 16 may also be configured to permit instillation of lighting within the elongate rail member 42 extrusion and therefore may include underside LED covers 216 and LED diffusers 218.

Figure 16:
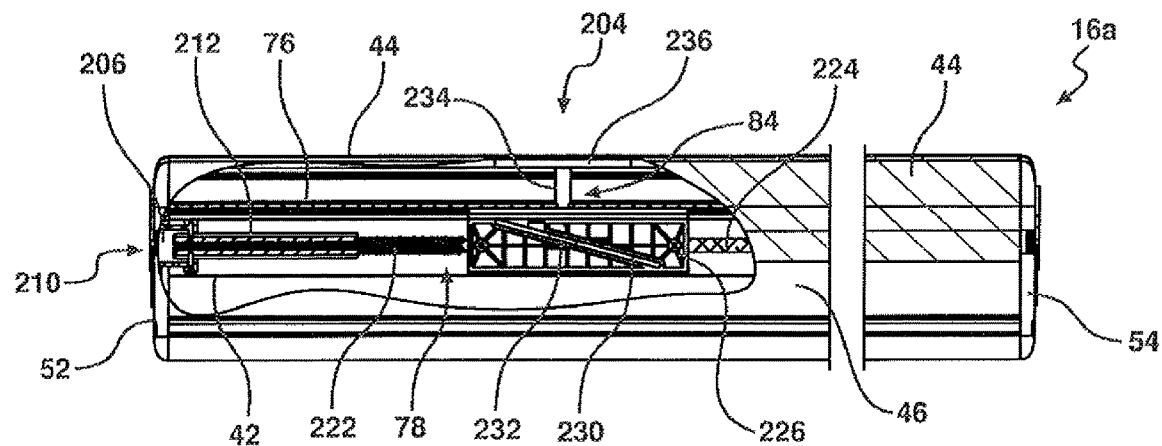
FIG. 16 is a side partial cross-sectional view of the rail assembly of FIG. 14, illustrating the adjustment device engaging the elongate capping member.

FIG. 16 illustrates the present embodiment of the adjustment device 204 and drive mechanism 75, that are positioned within longitudinally extending passageway 78. The drive mechanism 75 of the present embodiment includes the adjustment nut 212, which is held in place relative to the cover plate 68 by stabiliser plate 206 that engages groove 220, and a threaded rod 222. The spaced-apart adjustment devices 204, as illustrated in FIG. 22, are connected by way of joining rods 224.

Turning back to FIG. 16, the adjustment device 204 comprises an adjustment block 226 having a generally vertical channel 228 that intersects a perpendicular channel 230, that is oblique to a horizontal plane. A sliding nut 232 is positioned within the channel 230 and is connected to a generally vertically extending bolt 234 that extends through the vertical channel 228 and slot 84, wherein an upper end is connectable to a clamping nut 236. Each clamping nut 236 of a respective adjustment device 204 engages the groove 98 in the elongate capping member 44.

Figure 17:
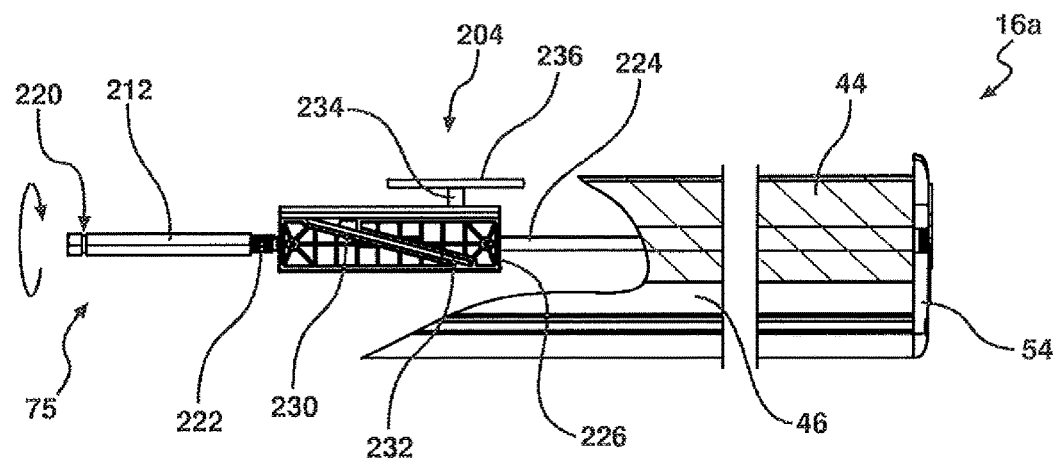
FIG. 17 is a side partial cross-sectional view of the rail assembly of FIG. 16, illustrating the adjustment device in a retracted position.

In this way, as the adjustment nut 212 of the present embodiment is rotated in a clockwise direction, as illustrated in FIG. 17, the adjustment block 226 is drawn longitudinally toward the cover plate 68, which causes sliding nut 232 to move downwardly along the oblique channel 230 that in turn draws the clamping nut 236 downwardly. Since the clamping nut 236 is connected within the groove 98 this causes the elongate capping member 44 to be drawn downwardly, in the direction of the arrow, into a retracted position, such that the flanges 100, 102, which extend outwardly from opposite sides thereof, are clamped down onto the upper surface of the solar panels 12, as was discussed with respect to FIG. 10.

Figure 18:
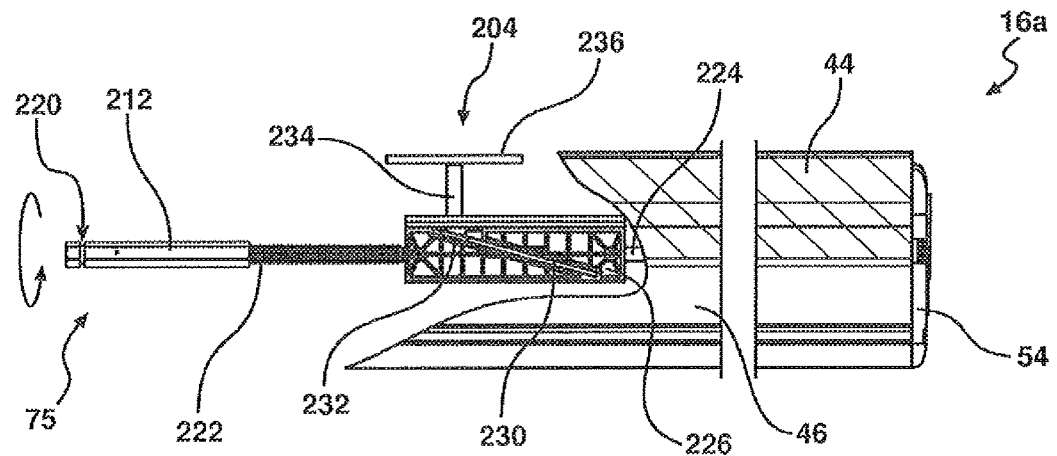
FIG. 18 is a side partial cross-sectional view of the rail assembly of FIG. 16, illustrating the adjustment device in an extended position.

To release the flanges 100, 102 from the solar panels, the adjustment nut 212 of the present embodiment, is rotated in a counter clockwise direction, as illustrated in FIG. 18, such that the adjustment block 226 is moved longitudinally away from the cover plate 68, which causes sliding nut 232 to move upwardly along the oblique channel 230 that in turn moves the clamping nut 236 upwardly. The reader will appreciate that since the clamping nut 236 is connected within the groove 98 this causes the elongate capping member 44 to be moved upwardly in the direction of the arrow, into an extended position, as illustrated in FIG. 18.

Figure 19:
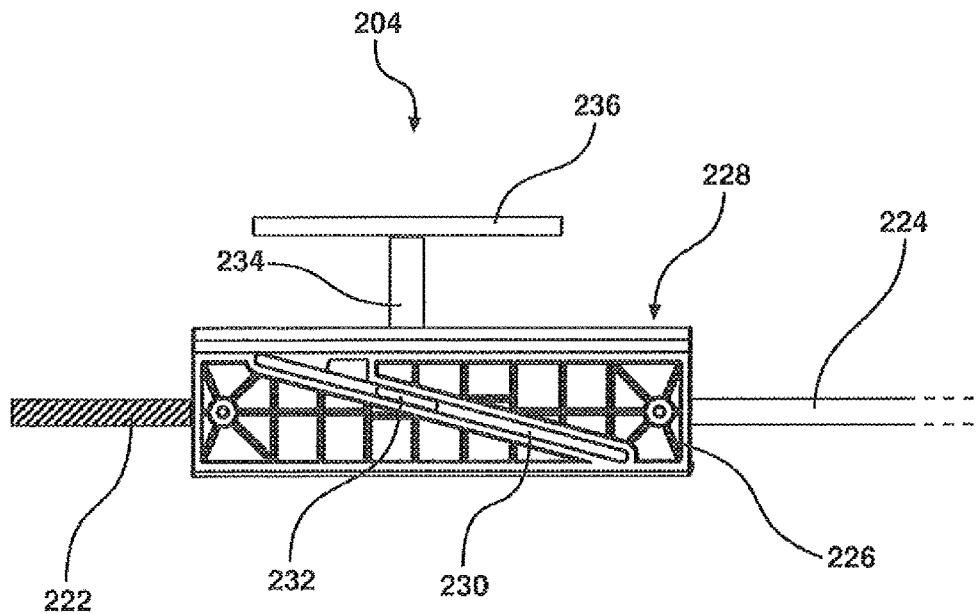
FIG. 19 is a side view of the adjustment device of FIG. 16.
Figure 20:
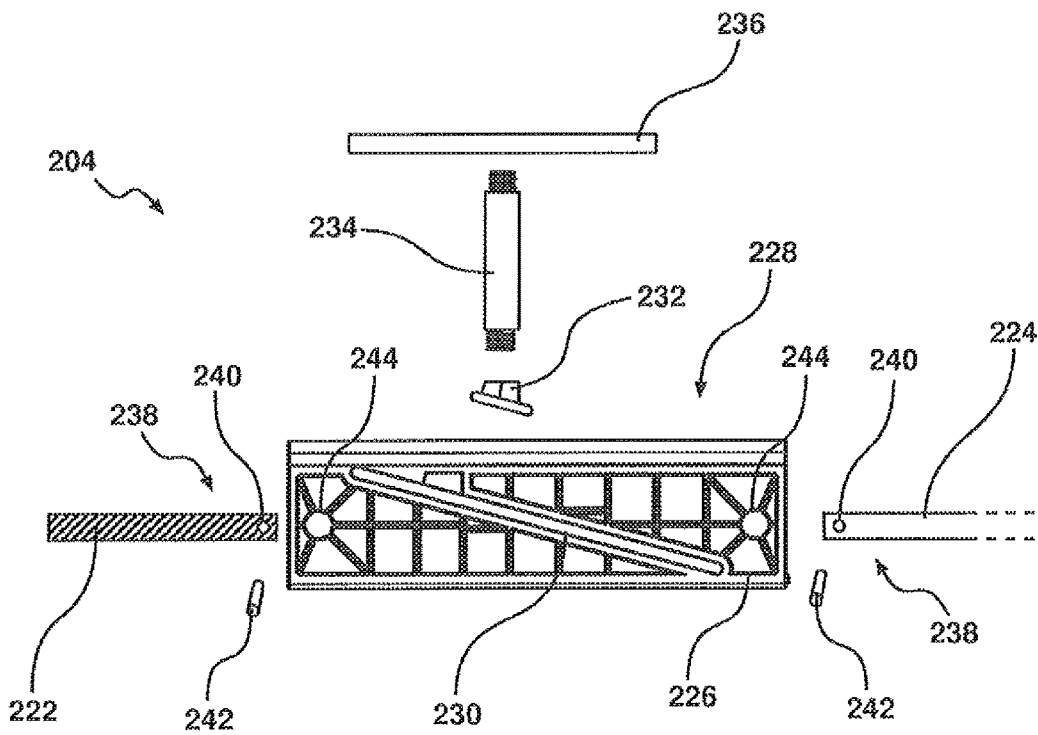
FIG. 20 is a side view of the disassembled adjustment device of FIG. 19.

As illustrated in FIGS. 19 and 20, respective ends 238 of the threaded rod 222 and joining rod 224 each include an aperture 240, wherein ends are configured to slot into respective sides of the adjustment block 226 and are held in place by pins 242 that engage through pin receiving apertures 244 and through a respective aperture 240 in the threaded rod 222 or joining rod 224.

FIG. 21b illustrates the connection of the blank 202 to the elongate capping member 44, wherein the blank includes a first protrusion 280 (shown in FIG. 15) that engage with mount 246, which is configured to also engage with the seal 104 when required, and a second protrusion 282 (shown in FIG. 15) engages with mount 248. The blank 202 also includes a depending flange 250 that extends over side cover 46, as the elongate capping member 44 is moved downwardly.

FIG. 22 illustrates the use of multiple tightening devices, in the form of adjustment device 204a to 204g, that are spaced-apart along the length of the elongate rail member 42 and connected to a single drive mechanism 75. The drive mechanism 75 can be adjusted from a single location S along the elongate rail member 42, to thereby clamp the elongate capping member 44 down onto the top of solar array panels 12 abutting or adjacent a side or sides thereof.

Figure 23:
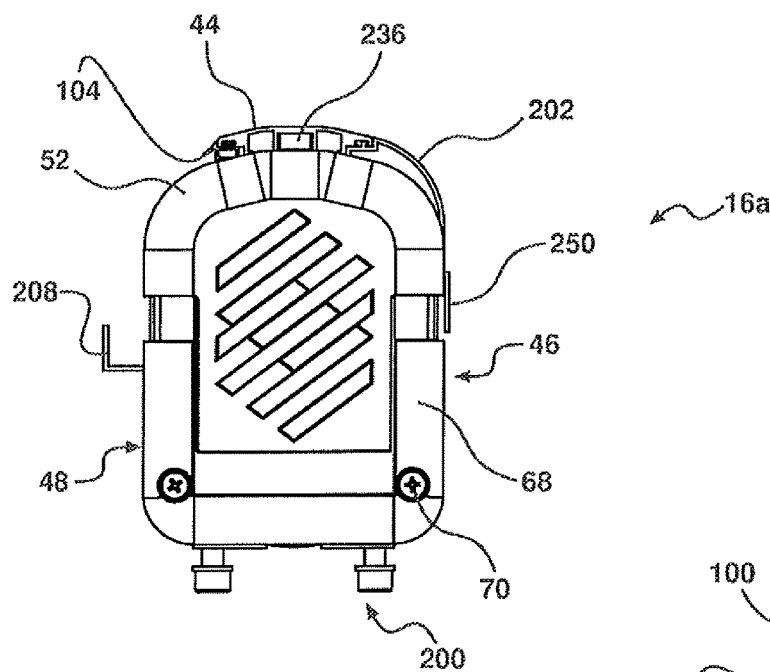
FIG. 23 is an end view of the rail assembly of FIG. 14, illustrating the elongate capping member is an extended position.
Figure 24:
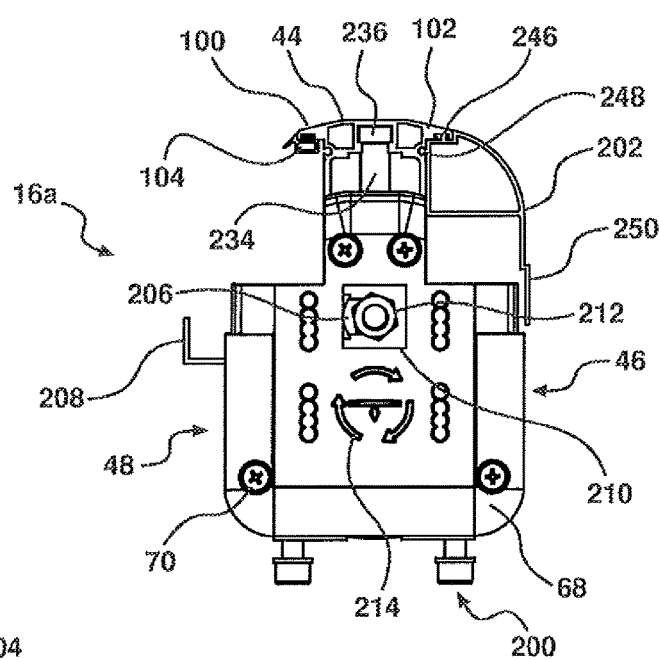
FIG. 24 is an end view of the rail assembly of FIG. 23 with end cap removed.

FIGS. 23 and 24 illustrate the elongate capping member 44 in a raised or partly raised position, illustrating how it extends above a top of the end cap 52 and how the depending flange 250 extends down over the side cover 46 even when the elongate capping member 44 is raised.

FIG. 25 illustrates rail assembly 16b of the present embodiment, wherein solar panels 12 are positionable on both sides of the elongate rail member 42. In this configuration, gutters 208 are attached on both sides of the elongate rail member 42 and seals 104 are connected to the underside of both flanges 100, 102 that extend outwardly from opposite sides of the elongate capping member 44.

The skilled addressee will now appreciate the advantages of the illustrated invention over the prior art. In one form the illustrated invention provides an apparatus and method of connecting solar panels to thereby form a roof structure, wherein the rail assemblies can be clamped along the edge of the solar panels from one end thereof. This reduces the chances of damage to the solar panels and increases the ease with which the roof structure can be constructed. The illustrated invention provides an apparatus and method of connecting solar panels wherein substantially all work is conducted from the underside of the roof structure, which means that the installer in not required to clamber over the solar modules that would increase the risk of damage thereto.

Various features of the invention have been particularly shown and described in connection with the exemplified embodiments of the invention, however it must be understood that these particular arrangements merely illustrate the invention and it is not limited thereto. Accordingly, the invention can include various modifications, which fall within the spirit and scope of the invention.

The invention claimed is:

1. An apparatus used for holding solar array panels, comprising:
   an elongate rail member;
   an elongate capping member movably connectable to the elongate rail member, the elongate capping member being adjustable for clamping said solar array panels therebetween;
   a plurality of adjustment devices which are interconnected, spaced apart along a length of said elongate rail member, being configured to move the elongate capping member in a generally vertical direction, relative to the elongate rail member, wherein each of the adjustment devices of the plurality of adjustment devices comprises an adjustment block having a generally vertical channel that intersects a perpendicular and oblique channel, a sliding nut being positioned within said generally vertical channel and connected to a generally vertically extending bolt that extends through the generally vertical channel and a slot in a top of the elongate rail member, wherein an upper end of the generally vertically extending bolt is connectable to a clamping nut; and
   a drive mechanism configured to control the movement of said plurality of adjustment devices to affect the clamping, wherein the drive mechanism being adjustable from a single location along said elongate rail member.

2. The apparatus in accordance with claim 1, wherein the plurality of adjustment devices and the drive mechanism form an adjustment mechanism, the adjustment mechanism including a worm drive, or a rack and pinion, or cables/wires, or a plurality of sliding blocks connected by rods.

3. The apparatus in accordance with claim 2, wherein an interconnected adjustment device of the plurality of adjustment devices and the drive mechanism are positioned at least partly within a longitudinally extending void or passageway in the elongate rail member.

4. The apparatus in accordance with claim 1, wherein the clamping nut is engageable within a groove in an underside of the elongate capping member.

5. The apparatus in accordance with claim 4, wherein a threaded rod of the drive mechanism and joining rods connect the plurality of adjustment devices, wherein the threaded rod and joining rods include respective apertures, and are configured to slot into respective sides of the respective adjustment block, such that each said adjustment block is held in place by respective pins, which engage through pin receiving apertures in the adjustment block and through a respective aperture in the threaded rod or joining rods.

6. The apparatus in accordance with claim 3, wherein the worm drive includes a worm drive shaft, worm drive portion, worm drive housing, and a threaded rod with generally square-shaped head, whereby the threaded rod engages the worm drive or an intermediate member to case the head to rise and lower relative to the worm drive housing.

7. The apparatus in accordance with claim 6, wherein the worm drive housing is connected to the elongate rail member and the head is attached to the elongate capping member, wherein movement of the worm drive causes the elongate capping member to be drawn down onto the elongate rail member.

8. The apparatus in accordance with claim 1, wherein the clamping provides a generally watertight connection, between the elongate capping member and elongate rail member and solar panels, to inhibit movement of water therebetween.

9. The apparatus in accordance with claim 1, wherein the elongate capping member includes a seal or seals, depending from an underside of a sidewardly projecting wing or wings of said elongate capping member to thereby bear against an upper surface of a solar array panel or panels.

10. The apparatus in accordance with claim 1, wherein the elongate rail member includes longitudinally extending voids configured to act as water channel or retain cabling therewithin.

11. A roof structure, comprising:
a support member;
a plurality of elongate rail members connectable to the support member; at least two solar array panels positioned intermediate of the plurality of elongate rail members;
respective elongate capping members movably connected to each of the plurality of elongate rail members, the elongate capping members being adjustable such that each elongate capping member clamps a solar array panel or panels to a corresponding elongate rail member, wherein each elongate capping member is adjustable from a single location along the corresponding elongate rail member;
a plurality of adjustment devices which are interconnected, spaced apart along a length of each said elongate rail member, being configured to move each respective elongate capping member in a generally vertical direction, relative to each elongate rail member, wherein each of the adjustment devices of the plurality of adjustment devices comprises an adjustment block having a generally vertical channel that intersects a perpendicular and oblique channel, a sliding nut being positioned within said generally vertical channel and connected to a generally vertically extending bolt that extends through the generally vertical channel and a slot in a top of each elongate rail member, wherein an upper end of the generally vertically extending bolt is connectable to a clamping nut; and
a drive mechanism configured to control the movement of said plurality of adjustment devices to affect the clamping, wherein the drive mechanism being adjustable from a single location along each elongate rail member.

12. The roof structure in accordance with claim 11, wherein the plurality of elongate rail members are connected to the support member in a generally parallel arrangement.

13. The roof structure in accordance with claim 11, wherein the support member is a frame or walls of a building, or the support member is a roof frame comprising a plurality of purlins and rafters supported on a wall structure or wall frame, or the support member is a plurality of freestanding posts.

14. A method of forming a roof structure, including the steps of:
constructing or providing a frame or walls to hold said roof structure;
attaching a support member or members to the frame or walls;
connecting at least two elongate rail members to the support member or members in a generally parallel arrangement, each of the at least two elongate rail members having a respective elongate capping member adjustably connected thereto;
positioning at least two solar array panels between the at least two elongate rail members, wherein the at least one solar array panel is supported on a part of the elongate rail members;
tightening the respective elongate capping members from a single location along a respective elongate rail member of the at least two elongate rail members, such that the respective elongate capping member bears down on an upper surface of the at least two solar array panels to thereby clamp the at least two solar array panels there between;
moving the respective elongate capping members with a plurality of adjustment devices that are interconnected and are spaced apart along a length of said at least two elongate rail members;
moving the respective elongate capping members in a generally vertical direction relative to the at least two elongate rail members with the plurality of adjustment devices, wherein each of the adjustment devices of the plurality of adjustment devices comprises an adjustment block having a generally vertical channel that intersects a perpendicular and oblique channel, a sliding nut positioned within said generally vertical channel and connected to a generally vertically extending bolt that extends through the vertical channel and a slot in a top of the respective elongate rail member;
connecting an upper end of the generally vertically extending bolt to a clamping nut; and
controlling movement of said plurality of adjustment devices to effect the clamping with a drive mechanism, wherein the drive mechanism is adjustable from a single location along said at least two elongate rail members.

* * * * *